(12) United States Patent
Handley et al.

(10) Patent No.: US 9,777,850 B1
(45) Date of Patent: Oct. 3, 2017

(54) APPARATUSES AND SYSTEMS FOR REGULATING FLUIDS THROUGH A PIPE AND METHODS OF USING THE SAME

(71) Applicant: Joelex, Inc., Chicago, IL (US)

(72) Inventors: Daniel A. Handley, Chicago, IL (US); Charles Robert Gass, Imlay City, MI (US)

(73) Assignee: Joelex, Inc., Chicago, IL (US)

(*) Notice: Subject to any disclaimer, the term of this patent is extended or adjusted under 35 U.S.C. 154(b) by 0 days.

(21) Appl. No.: 15/141,340

(22) Filed: Apr. 28, 2016

(51) Int. Cl.
| | |
|---|---|
| *F16K 15/06* | (2006.01) |
| *E03C 1/10* | (2006.01) |
| *F16K 1/36* | (2006.01) |
| *F16K 1/42* | (2006.01) |

(52) U.S. Cl.
CPC ............ *F16K 15/063* (2013.01); *E03C 1/104* (2013.01); *F16K 1/36* (2013.01); *F16K 1/42* (2013.01)

(58) Field of Classification Search
CPC . F16K 15/063; F16K 1/36; F16K 1/42; E03C 1/104
USPC .................................................. 137/528–540
See application file for complete search history.

(56) References Cited

U.S. PATENT DOCUMENTS

| | | | | |
|---|---|---|---|---|
| 2,301,276 A | * | 11/1942 | Gussick ................ | F16K 15/063 137/533.25 |
| 3,099,999 A | * | 8/1963 | Vismara ................ | F16K 15/026 137/515.5 |
| 8,707,981 B2 | * | 4/2014 | Edgeworth ........... | F16K 15/063 137/270 |

* cited by examiner

*Primary Examiner* — Kevin Lee
*Assistant Examiner* — P. Macade Nichols
(74) *Attorney, Agent, or Firm* — Scherrer Patent & Trademark Law, P.C.; Stephen T. Scherrer; Monique A. Morneault

(57) ABSTRACT

Apparatuses regulate the flow of fluids, such as, for example, water or other like fluids, through pipes. The apparatuses comprise a poppet valve having a spheroid-shaped valve portion and one or more shims for adjusting effective spring length during use thereof. Specifically and without being bound by theory, the apparatuses of the present invention creates a backward pressure in fluid traversing a pipe, wherein the backward pressure within the pipe provides compression to the fluid effectively compressing entrapped gas bubbles within the fluid, allowing more accurate water meter measurements. Moreover, the apparatuses of the present invention provide backflow prevention. Systems and methods for regulating the flow of fluids within a pipe are further provided.

19 Claims, 5 Drawing Sheets

APPARATUSES AND SYSTEMS FOR REGULATING FLUIDS THROUGH A PIPE AND METHODS OF USING THE SAME

TECHNICAL FIELD

The present invention relates to apparatuses for regulating the flow of fluids, such as, for example, water or other like fluids, through pipes. The apparatuses comprise a poppet valve having a spheroid-shaped valve portion and one or more shims for adjusting effective spring length during use thereof. Specifically and without being bound by theory, the apparatuses of the present invention creates a backward pressure in fluid traversing a pipe, wherein the backward pressure within the pipe provides compression to the fluid effectively compressing entrapped gas bubbles within the fluid, allowing more accurate water meter measurements. Moreover, the apparatuses of the present invention provide backflow prevention. Systems and methods for regulating fluids are further provided.

BACKGROUND

It is, of course, generally known to utilize pipes for transporting fluids, such as water, from one location to another. In modern times, users generally pay for the amount of water that flows into their homes or other buildings based on the volume of usage over a specific timeframe. Businesses, especially, can be saddled with high costs for water, especially when a large amount of water is necessary for industrial processes. Specifically, the more water a home or other building has flowing thereinto, the higher the cost to the user of the water.

However, water meters that measure the flow of water into a home or other building do so by reading the volume of fluid that passes through the water meter. Typically, water meters have a fan-like turbine apparatus that spins as the fluid flows therethrough. The rotation of the turbine apparatus directly correlates to the measurement of the volume of water through the water meter.

Importantly, since the water meter measures the volume of the fluid flowing therethrough, any additional component or material within the water may be falsely registered as water when, in fact, it is not. For example, entrapped gas bubbles, such as air, may accumulate within water pipes before the water reaches the water meter. The gas bubbles may artificially increase the volume flowing into the water meter, causing a false reading, since a water meter typically cannot distinguish between the volume of water and the volume of air. In other words, gas bubbles, such as air, entrapped within water flowing through pipes, may cause a water meter to register a higher volume of water than in actuality.

A need, therefore, exists, for apparatus, systems and methods for decreasing or removing the effect of entrapped bubbles within fluid, such as water, within a pipe. Further, a need exists for apparatus, systems and methods for providing a volume of fluid through a pipe that is more closely representative of the actual volume of the fluid within the pipe.

Specifically, a need exists for apparatus, systems and methods for removing the effect of entrapped gas bubbles within a fluid as the fluid flows through a meter, so that the meter may provide a more accurate reading of the volume of fluid flowing therethrough. In addition, a need exists for apparatus, systems and methods for effectively reducing the cost of water flowing into a home or other building.

Moreover, it is also generally known that water flowing into a home or other building may have periods of backflow, which may interfere with the quality of water that may flow into the home or other building. Specifically, while water may generally move in one direction during times of normal usage, certain occurrences of backflow may cause fouled water, contaminated water, or other fluids, to backflow, thereby fouling or otherwise contaminating the pipes and/or the source of the water.

Indeed, a flood within a home caused by extreme weather or other reasons may cause fouled water to flow the opposite direction within pipes. Moreover, it is feared that a terrorist may attempt to foul or otherwise contaminate fresh water by injecting or otherwise forcing an amount of a contaminated material, such as pathogenic, nuclear or other contamination, back through pipes from a water distribution node, such as a home or the like, into a water source. Backflow preventers are generally known that utilize a valve, such as a poppet or check valve to close when reverse pressure from backflow of fluids occurs. This may generally protect the pipes and/or the source of water from back flow conditions, caused by natural or unnatural conditions.

For example, U.S. Pat. Nos. 1,828,697 and 1,860,004, both to Yardley, disclose a check valve having a floating guide to allow the passage of fluids therethrough, but to prevent the backflow of fluids due to the valve body sitting on valve seat. However, neither of the Yardley patents recognizes the benefits of compressing gas within water or other fluid to provide a more accurate measurement of the flow of water therein in the manner presented herein, or providing a dual-chamber valve apparatus as disclosed in the present invention for backflow prevention.

In addition, U.S. Pat. App. Pub. No. 2012/0118406 to Edgeworth discloses apparatuses and systems to increase the efficiency of a water meter. However, Edgeworth suffers from lack of connectivity to pipes and other apparatuses, and use of an apparatus as described in Edgeworth will lead to failure of the apparatus as it is being used, as the springs are not guided to maintain their positions within the apparatus. Moreover, there is no recognition in Edgeworth to the benefits of a dual chamber apparatus.

However, although backflow preventers within pipes may be required in certain circumstances, backflow prevention is not a requirement in many homes. Thus, many homes or other buildings do not have this important safety feature.

A need, therefore, exists for improved apparatuses to increase the efficiency of water meters to read a true measurement of a flow of water therethrough. A need further exists for improved apparatuses that are resilient to failure during periods of long use, and can be relied upon.

In addition, a need exists for apparatuses, systems and methods that may be utilized as a backflow prevention device within a pipe, such as within a water pipe utilized to distribute fresh and clean water to a home or other building. Moreover, a need exists for apparatus, systems and methods that encourage homeowners or other building owners to install backflow preventers within their pipes to protect their pipes and sources of water.

A need further exists for apparatuses, systems and methods that provide the dual purpose of more accurately measuring the flow of water within pipes as well as providing backflow prevention in the event of backflow.

In addition, present valves allowing for water flow therethrough typically have frusto-conical shaped valve heads that may sit within frusto-conical shaped valve seats. Thus, the points of contact between the valve head and the valve seat may be longitudinally linear, which may contribute to leaks or failure to seal properly when closed. Moreover, frusto-conical valve seats may interfere with the flow of fluids therethrough, contributing to turbulence that may be present within the apparatus when open. Thus, a need exists for apparatuses, systems and methods of the present invention that include non-linear longitudinal sealing surfaces between the valve head and the valve seat to prevent leakages, and aid in decreasing turbulence as fluid flows therethrough.

Further, typical valves that are utilized in the manner described herein utilize a spring to provide tension against the flow of fluid. There are several ways to adjust the tension of springs. One way is to exchange springs to change the spring constant thereof. However, changing springs in an apparatus is often difficult, because the apparatus requires disassembly to remove and exchange the spring. Another option is to lengthen or shorten the spring within the apparatus to change its tension based on the water pressure applied against the valve. Thus, a need exists for apparatuses, systems and methods allowing for the lengthening and shortening of the spring contained therein based on the water pressure applied to the valve to optimize the apparatuses.

SUMMARY OF THE INVENTION

The present invention relates to apparatuses for regulating the flow of fluids, such as, for example, water or other like fluids, through pipes. The apparatuses comprise a poppet valve having a spheroid-shaped valve portion and one or more shims for adjusting effective spring length during use thereof. Specifically and without being bound by theory, the apparatuses of the present invention creates a backward pressure in fluid traversing a pipe, wherein the backward pressure within the pipe provides compression to the fluid effectively compressing entrapped gas bubbles within the fluid, allowing more accurate water meter measurements. Moreover, the apparatuses of the present invention provide backflow prevention. Systems and methods for regulating fluids are further provided.

To this end, in an embodiment of the present invention, an apparatus for managing the flow of fluid through a pipe is provided. The apparatus comprises: a housing forming an internal chamber having an inlet opening and an outlet opening wherein pressurized fluid flows through the housing; a valve head mounted to a shaft and disposed within the internal chamber, the valve head configured to contact a seat in proximity to the inlet opening to form a closed position wherein the valve head contacting the seat prevents the flow of fluid through the housing and into the chamber from the inlet opening, wherein the valve head has a longitudinally non-linear surface that contacts the valve seat when the valve head is in the closed position; a base plate spanning a cross-section of the housing in proximity to the outlet opening, the base plate having a central opening slidably receiving the shaft, an internal surface, and at least one aperture within the base plate for allowing the flow of fluid through the outlet opening; and a spring around the shaft disposed between the base plate and the valve head, wherein movement of the valve head toward the base plate causes a compression of the spring.

In an embodiment, the valve head is a shape selected from the group consisting of a partial sphere, a spheroid shape and an ovoid shape.

In an embodiment, the valve seat comprises a mating surface configured to engage the surface of the valve head.

In an embodiment, the mating surface of the valve seat comprises a corresponding shape as the valve head surface.

In an embodiment, the apparatus further comprises a first shim plate adjacent the base plate configured to shorten the effective length of the spring.

In an embodiment, the apparatus further comprises a second shim plate configured to shorten the effective length of the spring.

In an embodiment, the second shim plate is in a position selected from the group consisting of adjacent the first shim plate and adjacent the base plate.

In an alternate embodiment of the present invention, an apparatus for managing the flow of fluid through a pipe is provided. The apparatus comprises: a housing forming an internal chamber having an inlet opening and an outlet opening wherein pressurized fluid flows through the housing; a valve head mounted to a shaft and disposed within the internal chamber, the valve head configured to contact a seat in proximity to the inlet opening to form a closed position wherein the valve head contacting the seat prevents the flow of fluid through the housing and into the chamber from the inlet opening; a base plate spanning a cross-section of the housing in proximity to the outlet opening, the base plate having a central opening slidably receiving the shaft, an internal surface, and at least one aperture within the base plate for allowing the flow of fluid through the outlet opening; a spring around the shaft disposed between the base plate and the valve head, wherein movement of the valve head toward the base plate causes a compression of the spring; and a first shim plate configured to shorten the effective length of the spring compared to the apparatus without the first shim plate.

In an embodiment, the first shim plate is positioned adjacent the base plate.

In an embodiment, the apparatus further comprises a second shim plate configured to shorten the effective length of the spring compared to the apparatus without the second shim plate.

In an embodiment, the second shim plate is in a position selected from the group consisting of adjacent the first shim plate and adjacent the base plate.

In an embodiment, the valve head has a longitudinally non-linear surface that contacts the valve seat when the valve head is in the closed position.

In an embodiment, the valve head is a shape selected from the group consisting of a partial sphere, a spheroid shape and an ovoid shape.

In an embodiment, the valve seat comprises a mating surface configured to engage the surface of the valve head.

In an embodiment, the mating surface of the valve seat comprises a corresponding shape as the valve head surface.

In an alternate embodiment of the present invention, a method of controlling the flow of fluid through a pipe is provided. The method comprises the steps of: providing a valve apparatus comprising a housing forming an internal chamber having an inlet opening and an outlet opening wherein pressurized fluid flows through the housing, a valve head mounted to a shaft and disposed within the internal chamber, the valve head configured to contact a seat in proximity to the inlet opening to form a closed position wherein the valve head contacting the seat prevents the flow of fluid through the housing and into the chamber from the inlet opening, a base plate spanning a cross-section of the housing in proximity to the outlet opening, the base plate having a central opening slidably receiving the shaft, an internal surface, and at least one aperture within the base plate for allowing the flow of fluid through the outlet opening, and a spring around the shaft disposed between the base plate and the valve head, wherein movement of the valve head toward the base plate causes a compression of the spring; and adding a first shim plate in a position in the housing to shorten the effective length of the spring.

In an embodiment, the first shim plate is added to the housing at a position adjacent the base plate. In an embodiment, the method further comprises the step of: adding a second shim plate to the housing to further shorten the effective length of the spring.

In an embodiment, the second shim plate is added to the housing at a position selected from the group consisting of adjacent the first shim plate and adjacent the base plate.

In an embodiment, the valve head has a longitudinally non-linear surface that contacts the valve seat when the valve head is in the closed position It is, therefore, an objective and advantage of the present invention to provide improved apparatuses, systems and methods to increase the efficiency of water meters to read a true measurement of a flow of water therethrough.

It is an a further objective and advantage of the present invention to provide improved apparatuses, systems and methods that are resilient to failure during periods of long use, and can be relied upon.

It is also an objective and advantage of the present invention to provide apparatuses, systems and methods for decreasing or removing the effect of entrapped bubbles within fluid, such as water, within a pipe.

Further, it is an objective and advantage of the present invention to provide apparatuses, systems and methods for providing a volume of fluid through a pipe that is more closely representative of the actual volume of the fluid within the pipe.

Specifically, it is an objective and advantage of the present invention to provide apparatuses, systems and methods for removing the effect of entrapped gas bubbles within a fluid as the fluid flows through a meter, so that the meter may provide a more accurate reading of the volume of fluid flowing therethrough.

In addition, it is an objective and advantage of the present invention to provide apparatuses, systems and methods for effectively reducing the cost of water flowing into a home or other building.

Moreover, it is an objective and advantage of the present invention to provide apparatuses, systems and methods that may be utilized as a backflow prevention device within a pipe, such as within a water pipe utilized to distribute fresh and clean water to a home or other building.

Moreover, it is an objective and advantage or the present invention to provide apparatus, systems and methods that encourage homeowners or other building owners to install backflow preventers within their pipes to protect their pipes and sources of water.

It is a further objective and advantage of the present invention to provide apparatuses, systems and methods that provide the dual purpose of more accurately measuring the flow of water within pipes as well as providing backflow prevention in the event of backflow.

Further, it is an objective and advantage of the present invention to provide apparatuses, systems and methods that include non-linear longitudinal sealing surfaces between the valve head and the valve seat to prevent leakages, and aid in decreasing turbulence as fluid flows therethrough.

Still further, it is an objective and advantage of the present invention to provide apparatuses, systems and methods allowing for the lengthening and shortening of the spring contained therein based on the water pressure applied to the valve to optimize the apparatus.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to apparatuses for managing the flow of fluids, such as, for example, water or other like fluids, through pipes. The apparatuses comprise a poppet valve having a spheroid-shaped valve portion and one or more shims for adjusting effective spring length during use thereof. Specifically and without being bound by theory, the apparatuses of the present invention creates a backward pressure in fluid traversing a pipe, wherein the backward pressure within the pipe provides compression to the fluid effectively compressing entrapped gas bubbles within the fluid, allowing more accurate water meter measurements. Moreover, the apparatuses of the present invention provide backflow prevention. Systems and methods for managing fluids are further provided.

Figure 1:
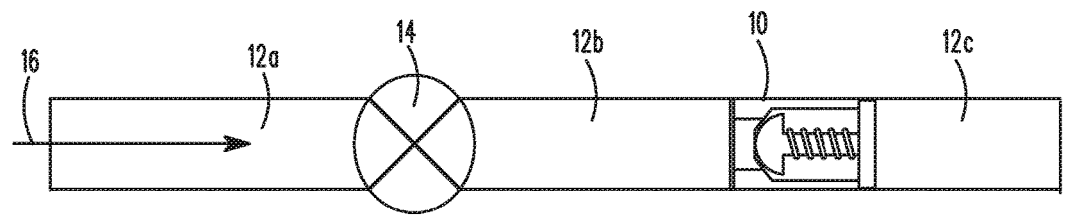
FIG. 1 illustrates a representative of an apparatus of the present invention in-line within a pipe in position to affect the measured volume of water flowing through a water meter in an embodiment of the present invention.

Referring now to the figures, wherein like numerals refer to like parts, FIG. 1 illustrates a representation of an apparatus 10 in an embodiment of the present invention. The apparatus 10 may be disposed in-line with a pipe, represented by pipe sections 12a, 12b, 12c that may provide a flow of a fluid therethrough. The fluid may flow, generally, from left to right in FIG. 1, as represented by the arrow 16. In a preferred embodiment, the fluid may be water, and the pipe sections 12a, 12b, 12c may be parts of a water distribution pipe allowing the flow of fresh and clean water into a home or another building, as apparent to one of ordinary skill in the art. It should be noted, however, that the apparatus 10 of the present invention may be utilized for impacting the flow of other fluids and should not be limited as described herein.

Also in-line with the pipe may be a fluid flow meter 14 for measuring the volume of fluid flowing therethrough. Thus, given a certain period of time, a total volume of fluid may be determined based on the rate of flow of fluid volume through the fluid flow meter 14. The fluid flow meter may be any meter apparent to one of ordinary skill in the art, and the specific type of meter is unimportant for purposes of the present invention. It is typical for water flowing within pipes, especially from a source, to contain an amount of air bubbles or other gas entrapped within the fluid. Gas bubbles within the fluid flowing through the water meter 14 may cause a falsely higher measurement of fluid volume flowing therethrough, leading to an inaccurate report. An inaccurate report of the volume of fluid flowing through the fluid flow meter 14 may cause an artificially increased cost of fluid consumption.

While not being bound by theory, fluid, such as water, for example, flowing through the pipe of the present invention may be compressed by having an amount of back pressure induced on the fluid by the apparatus 10. Specifically, the valve contained within the apparatus 10, as shown in more detail below with respect to FIGS. 2-8, may induce a back pressure on the fluid upstream from the apparatus 10, thereby compressing the air bubbles in the fluid upstream from the apparatus 10. The compression of the fluid compresses the air bubbles within the water to take up a small volume of space in the vicinity immediately upstream from the apparatus 10. Specifically, the compression of the air bubbles may be maintained for approximately five to ten feet upstream from the apparatus 10. Thus, positioning the apparatus downstream but within proximity of the fluid flow meter 14 may allow the fluid flow meter 14 to measure a truer and more accurate volume of fluid flowing within the pipe. Thus, it is preferred that the apparatus 10 of the present invention be positioned within three to ten feet downstream of the fluid flow meter 14, more preferably four feet to seven feet downstream of the fluid flow meter 14, although the present invention should not be limited as described herein.

In operation, a poppet valve (detailed below) within apparatus 10 oscillates as pressure builds within the pipe 12b, caused by the apparatus 10 pushing back against the flow of fluid therethrough. The oscillation of the poppet valve causes the compression of gas within the fluid upstream of the apparatus 10, causing a truer reading of the fluid flow through the fluid flow meter 14.

Figure 2A:
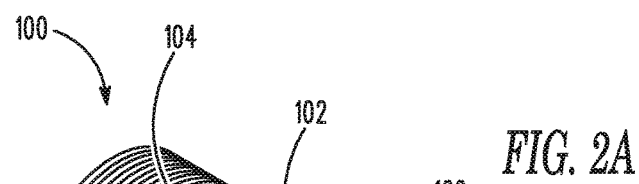
FIGS. 2A and 2B illustrate perspective views of an apparatus in an embodiment of the present invention.
Figure 2B:
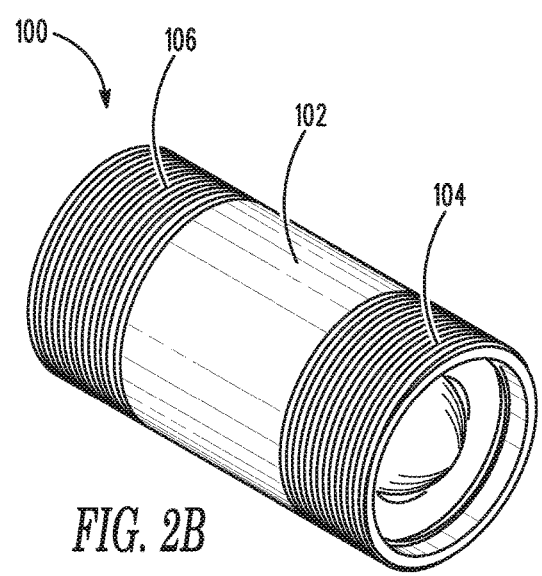

FIG. 2A illustrates a perspective view of a valve apparatus 100 that may be placed in line within a pipe, and FIG. 2B illustrates a reverse perspective view of the valve apparatus 100. The valve apparatus 100 may comprise a housing 102 that may be made from any material useful for holding the components described herein, such as a thermoplastic, such as PVC, or metal. The apparatus 100 may comprise a first threaded end 104 and a second threaded end 106. Fluid may flow into the valve apparatus through first threaded end 104 and out through second threaded end 106 in normal usage. When disposed in-line within a pipe, the first and second threaded ends 104, 106 may threadedly interconnect with the fluid pipe.

Figure 3:
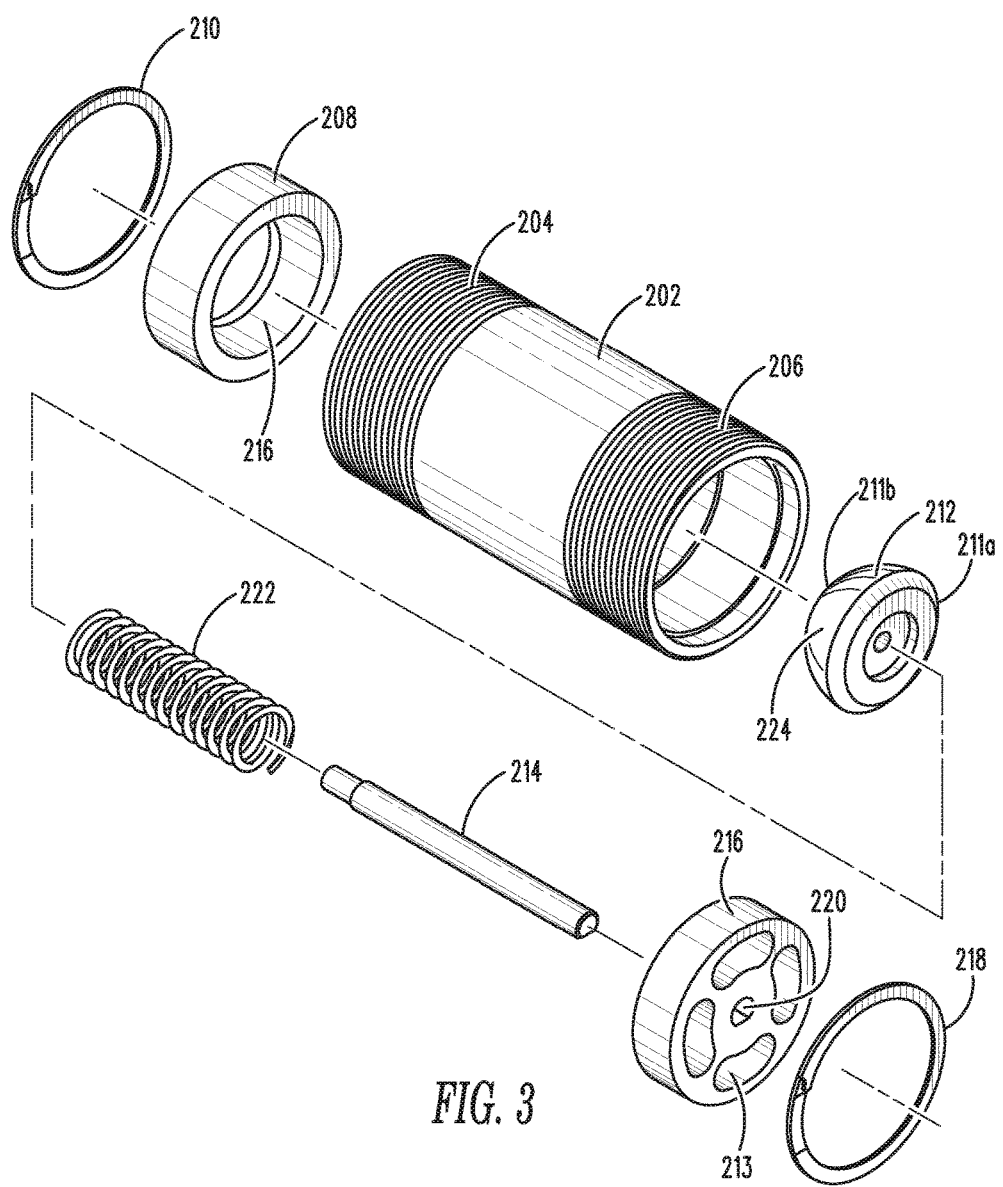
FIG. 3 illustrates an exploded view of an apparatus in an embodiment of the present invention.

FIG. 3 illustrates an exploded view of a valve apparatus 200 in an embodiment of the present invention. The apparatus 200 may comprise a cylindrical housing 202 having a first threaded end 204 and a second threaded end 206. The first and second threaded ends 204, 206 may be placed and threadedly fastened in line with a pipe, as illustrated in FIG. 1 or in a dual-chamber apparatus, as disclosed in FIG. 2, with two valve apparatuses 200 serially disposed adjacent one another. The housing may comprise a valve seat 208 disposed inside the first threaded end 204 and held in place with a ring 210.

A valve head 212 having a rod 214 disposed in a back end of the head 212 and held in place via any known means, such as via adhesive, threads, or other like means for holding the rod 214 in the head 212. A base plate 216 may be disposed in the second threaded end 206 of the housing 202 and held in place via a ring 218. The base plate 216 may have flow holes 213 disposed therein for allowing fluid to flow therethrough. The rod 214 may fit within an aperture 220 within the base plate 216. The valve head 212 may be biased against the valve seat 208 via spring 222. FIG. 4 illustrates a cross-section of the valve apparatus 200 showing the valve head 212 biased against valve seat 208 via spring 222.

Figure 4A:
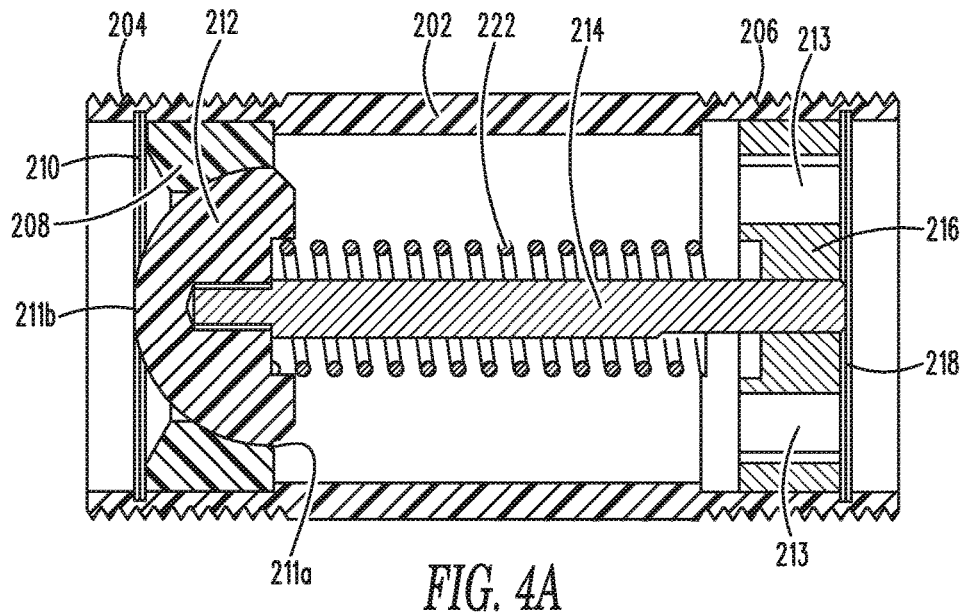
FIGS. 4A and 4B illustrate a cross-sectional view of an apparatus in a closed configuration and in an open configuration in an embodiment of the present invention.
Figure 4B:
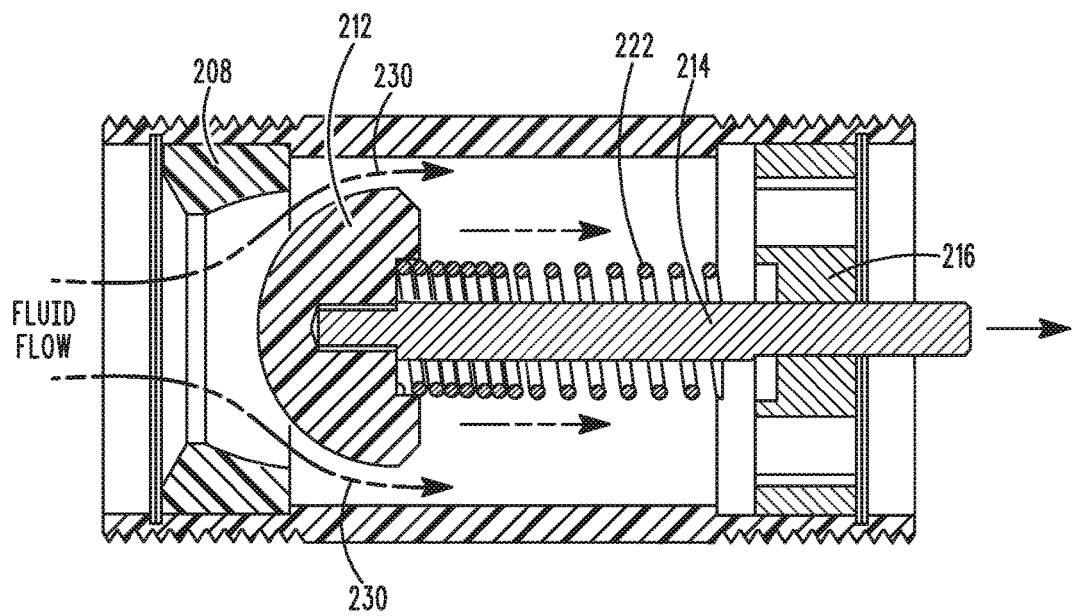

The valve head 212, as illustrated in FIGS. 3 and 4A, 4B, may have a longitudinal non-linear surface 224. Specifically, the longitudinally non-linear surface is the surface that runs from a back edge 211a to a front point 211b on a front edge of the valve head, specifically longitudinally through the housing along the surface of the valve head 212, as illustrated in FIG. 3. More specifically, the valve head 212 may have the shape of a sphere, partial sphere or may be ovoid in shape. The non-linear surface 224 may aid in sealing the valve head 212 against the valve seat 208, which may have an internal surface 226 having a matching shape as the valve head surface 224 so that the valve head surface 224 may fit directly against the internal surface 226 of the valve seat 208.

In use, as illustrated in FIG. 4A, the apparatus 200 may be placed in-line in a pipe having a fluid flowing therethrough, such as a gas or, preferably, a liquid, such as water. The valve head 208 may be biased against the valve seat 208 thereby preventing the fluid from flowing therethrough. Fluid pressure will thus build across the surface of the valve head 212 until the fluid pressure force overcomes the spring force biasing the valve head 212 against the valve seat 208, opening a fluid flow passage 230 between the valve head 212 and the valve seat 208, thereby allowing fluid to flow therethrough. When the fluid begins to flow therethrough, the fluid pressure may drop, allowing the spring force to bias the valve head 212 back against the valve seat 208, thereby closing the fluid flow passage 230, thereby blocking the fluid flow. The fluid pressure may then build once again, and the cycle may start again. The cycle may occur rapidly, causing an oscillation in the valve head 212 as it constantly moves away from and toward the valve seat 208, rapidly opening and closing the fluid flow passage 230.

Figure 5:
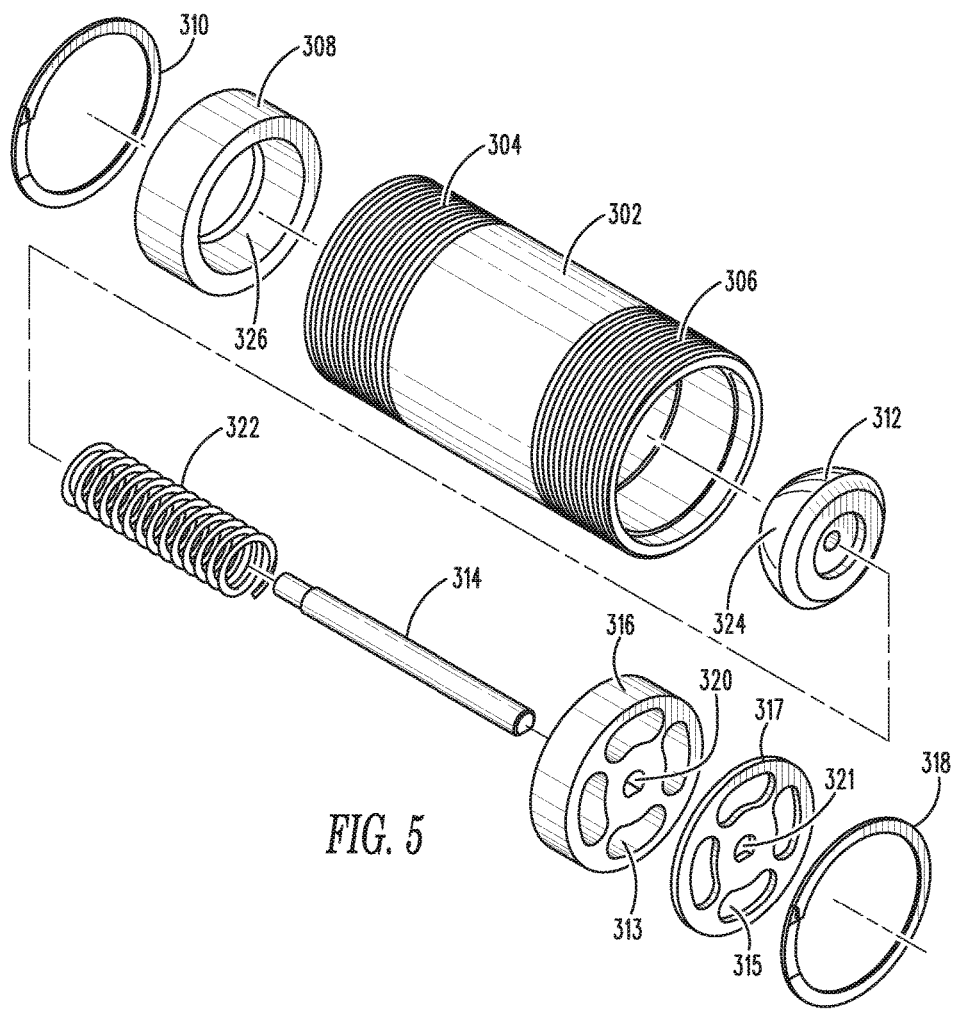
FIG. 5 illustrates an exploded view of an apparatus in an alternate embodiment of the present invention.
Figure 6:
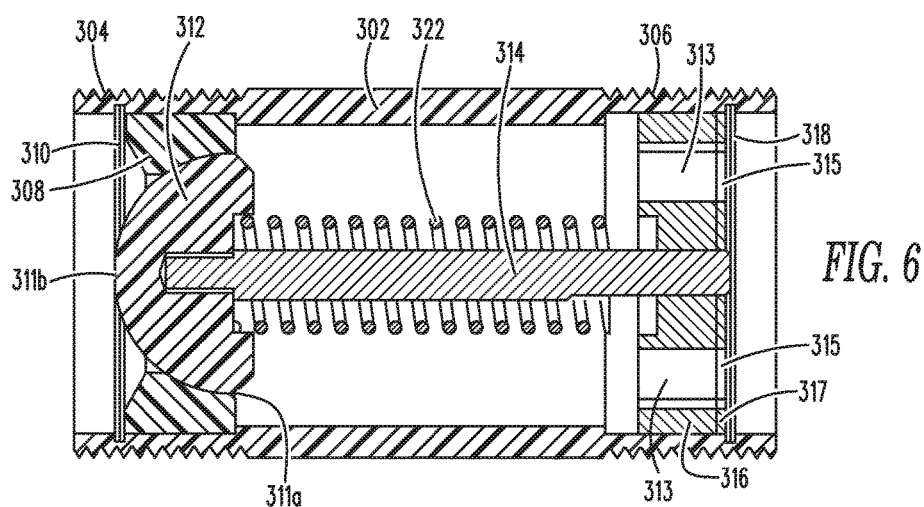
FIG. 6 illustrates a cross-sectional view of an apparatus in the alternate embodiment of the present invention.

FIGS. 5 and 6 illustrate an alternate embodiment of the present invention, of a valve control apparatus 300. FIG. 5 illustrates an exploded view of a valve apparatus 300 in an embodiment of the present invention. The apparatus 300 may comprise a cylindrical housing 302 having a first threaded end 304 and a second threaded end 306. The first and second threaded ends 304, 306 may be placed and threadedly fastened in line with a pipe, as illustrated in FIG. 1 or in a dual-chamber apparatus, as disclosed in FIG. 2, with two valve apparatuses 300 serially disposed adjacent one another, or a first apparatus 200 and a second apparatus 300 serially disposed adjacent one another. The housing may comprise a valve seat 308 disposed inside the first threaded end 304 and held in place with a ring 310.

A valve head 312 having a rod 314 disposed in a back end of the head 312 and held in place via any known means, such as via adhesive, threads, or other like means for holding the rod 314 in the head 312. A base plate 316 may be disposed in the second threaded end 306 of the housing 302 and held in place via a ring 318. The base plate 316 may have flow holes 313 disposed therein for allowing fluid to flow therethrough. The rod 314 may fit within an aperture 320 within the base plate 316. The valve head 312 may be biased against the valve seat 308 via spring 322. FIG. 6 illustrates a cross-section of the valve apparatus 300 showing the valve head 312 biased against valve seat 308 via spring 322.

The valve head 312, as illustrated in FIGS. 5 and 6, may have a non-linear surface 324. Specifically, the non-linear longitudinal surface is the surface that runs from a back edge 311a to a front point 311b on a front edge of the valve head, as illustrated in FIG. 5. More specifically, the valve head 312 may have the shape of a sphere, partial sphere or may be ovoid in shape. The non-linear surface 324 may aid in sealing the valve head 312 against the valve seat 308, which may have an internal surface 326 having a matching shape as the valve head surface 324 so that the valve head surface 324 may fit directly against the internal surface 326 of the valve seat 308.

A shim plate 317 may be placed between the base plate 316 and the ring 318 to position the base plate 316 closer to the valve head 312, thereby shortening the effective length of the spring 322 within the housing 302. Hooke's law specifies that the further a spring is compressed, the harder the spring pushes back in the opposite direction. Thus, by shortening the effective length of the spring within the housing by adding the shim plate 317, the harder the spring pushes the valve head 312 into the valve seat 308, and the more fluid pressure against the valve head 312 is required to open the valve head. The shim plate 317 may further have flow holes 315 allowing fluid to flow therethrough.

The rod 314 may travel through the aperture 320 of the base plate 316 and aperture 321 of the shim plate 317. The rod 314 may have a specific shape, in cross-section, such as round with a flattened side and may fit within the apertures 320, 321 which may also be shaped to match. Thus, the cross-sectional shape of the rod 314 may keep the base plate 316 and the shim plate 317 in alignment, thereby ensuring the that flow holes 313 disposed in the base plate 316 are aligned with the flow holes 315 in the shim plate 317, providing uninterrupted flow through the apparatus 300.

As noted above, by shortening the effective length of the spring 322 within the housing 302, the spring 322 may have greater pushing force for biasing the valve head 312 against the valve seat 308, compared to the pushing force of the spring 222 without the shim plate 317, as shown in FIGS. 3, 4A and 4B. Thus, a greater fluid pressure is required to move the valve head 312 away from the valve seat 308 and cause the oscillation of the valve head 312 when in use. Therefore, when it is necessary to require a greater fluid pressure to cause the oscillation of the valve head 312, the shim plate 317 may be placed within the housing 302 to increase the fluid pressure required. Thus, the apparatuses of the present invention may be adjustable to fit the situation needed. In addition, it should be noted that the shim plate 317 may be any thickness needed to adjust the effective length of the spring 322, as necessary.

Figure 7:
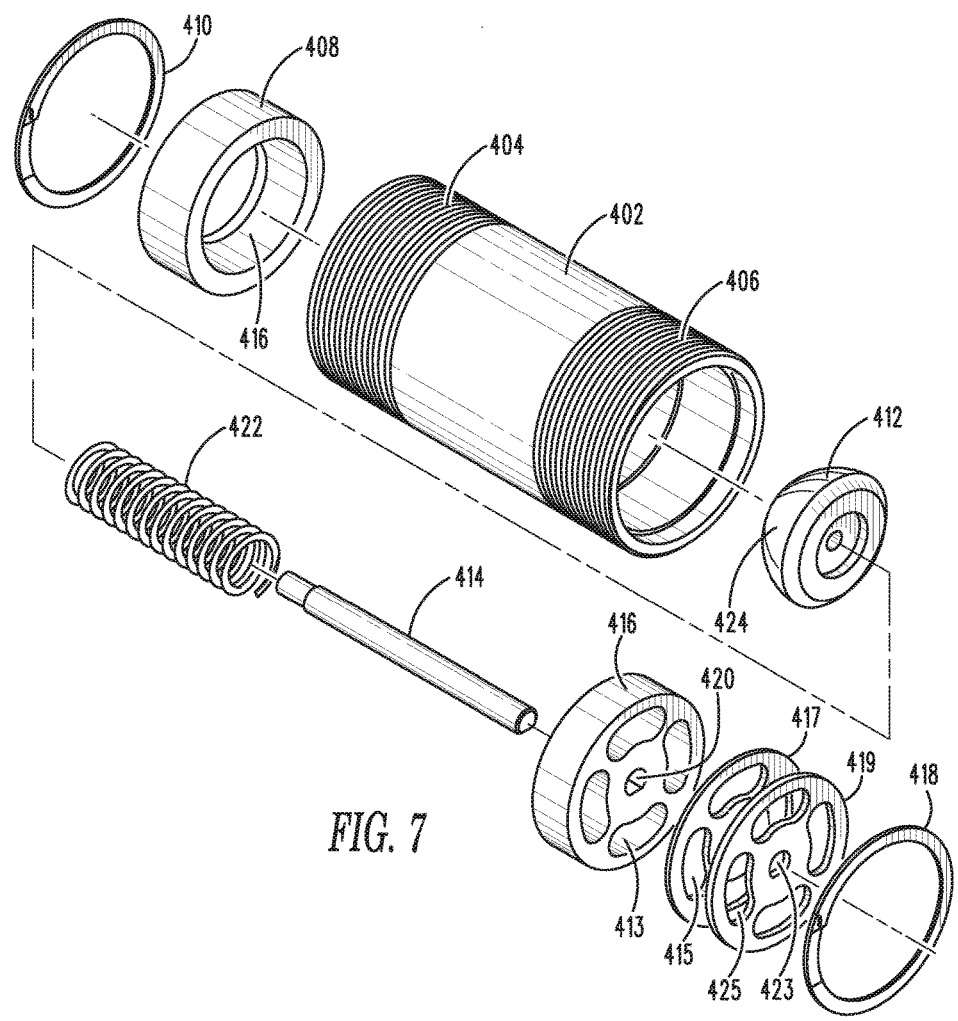
FIG. 7 illustrates an exploded view of an apparatus in a further alternate embodiment of the present invention.
Figure 8:
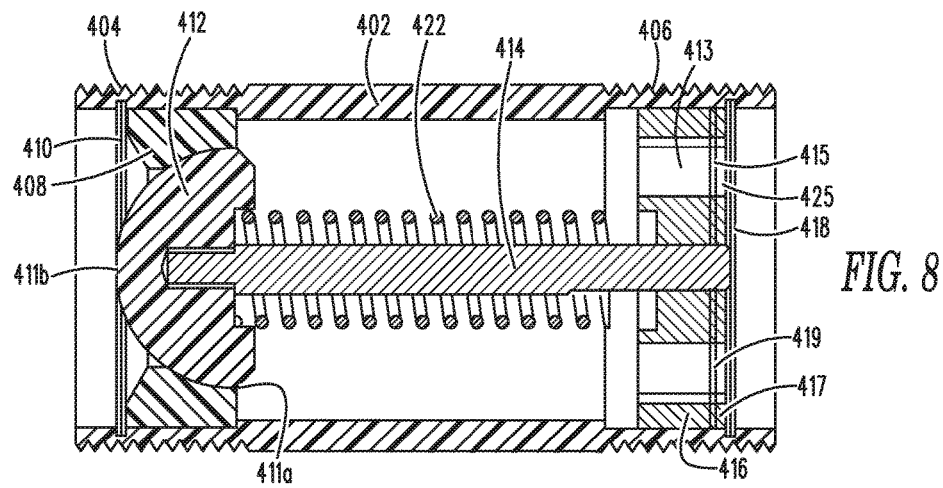
FIG. 8 illustrates a cross-sectional view of an apparatus in the further alternate embodiment of the present invention.

FIGS. 7 and 8 illustrate yet another alternate embodiment of the present invention, of a valve control apparatus 400. FIG. 7 illustrates an exploded view of the valve apparatus 400 in an embodiment of the present invention. The apparatus 400 may comprise a cylindrical housing 402 having a first threaded end 404 and a second threaded end 406. The first and second threaded ends 404, 406 may be placed and threadedly fastened in line with a pipe, as illustrated in FIG. 1 or in a dual-chamber apparatus, as disclosed in FIG. 2, with two valve apparatuses 400 serially disposed adjacent one another, or a first apparatus 400 and a second apparatus 200 or 300 serially disposed adjacent one another. The housing may comprise a valve seat 408 disposed inside the first threaded end 404 and held in place with a ring 410.

A valve head 412 having a rod 414 disposed in a back end of the head 412 and held in place via any known means, such as via adhesive, threads, or other like means for holding the rod 414 in the head 412. A base plate 416 may be disposed in the second threaded end 406 of the housing 402 and held in place via a ring 418. The base plate 416 may have flow holes 413 disposed therein for allowing fluid to flow therethrough. The rod 414 may fit within an aperture 420 within the base plate 416, and may travel therethrough when the valve apparatus 400 is in operation. The valve head 412 may be biased against the valve seat 408 via spring 422. FIG. 8 illustrates a cross-section of the valve apparatus 400 showing the valve head 412 biased against valve seat 408 via spring 422.

The valve head 412, as illustrated in FIGS. 7 and 8, may have a non-linear surface 424. Specifically, the non-linear longitudinal surface is the surface that runs from a back edge 411a to a front point 411b on a front edge of the valve head 412, as illustrated in FIG. 7. More specifically, the valve head 412 may have the shape of a sphere, partial sphere or may be ovoid in shape. The non-linear surface 424 may aid in sealing the valve head 412 against the valve seat 408, which may have an internal surface 426 having a matching shape as the valve head surface 424 so that the valve head surface 424 may fit directly against the internal surface 426 of the valve seat 408.

A first shim plate 417 may be placed between the base plate 416 and the ring 418 to position the base plate 416 closer to the valve head 412, thereby shortening the effective length of the spring 422 within the housing 402. The shim plate 417 may further have flow holes 415 allowing fluid to flow therethrough and an aperture 421 to allow the rod 414 to travel therethrough. In addition, a second shim plate 419 maybe placed between the base plate and the ring 418, adjacent the first shim plate 417 to further shorten the effective length of the spring 422 within the housing 402. The second shim plate may have flow holes 425 allowing flow to flow therethrough and an aperture 423 to allow the rod 414 to also travel therethrough. The first and second shim plates may be of different thicknesses, or may be the same thickness as each other. If of different thicknesses, then the valve apparatus 400 may have four different ways to set the effective length of the spring, either without any shim plates, as illustrated in FIGS. 3, 4A and 4B, with a first single shim plate of a first thickness, or a second single shim plate of a second thickness. Finally, both shim plates may be added within the housing 402.

Specifically, the rod 414 may travel through the aperture 420 of the base plate 416, aperture 421 of the first shim plate 417 and aperture 423 of the second shim plate 419. The rod 414 may have a specific shape, in cross-section, such as round with a flattened side and may fit within the apertures 420, 421, 423 which may also be shaped to match. Thus, the cross-sectional shape of the rod 414 may keep the base plate 416, the first shim plate 417 and second shim plate 419 in alignment, thereby ensuring the that flow holes 413 disposed in the base plate 416 are aligned with the flow holes 415 in the first shim plate 417 and the flow holes 425 in the second shim plate 419.

By shortening the effective length of the spring 422 within the housing 402, the spring 422 may have greater pushing force for biasing the valve head 412 against the valve seat 408, compared to the pushing force of the spring 222 or spring 322, as shown in FIGS. 3-6. Thus, a greater fluid pressure is required to move the valve head 412 away from the valve seat 408 and cause the oscillation of the valve head 412 when in use. Therefore, when it is necessary to require a greater fluid pressure to cause the oscillation of the valve head 412, the first shim plate 317 and the second shim plate 419 may be placed within the housing 402 to increase the fluid pressure required. Thus, the apparatuses of the present invention may be adjustable to fit the situation needed.

The first and second shim plates may be of different thicknesses, or may be the same thickness as each other. If of different thicknesses, then the valve apparatus 400 may have four different ways to set the effective length of the spring, either without any shim plates, as illustrated in FIGS. 3, 4A and 4B, or with a first single shim plate of a first thickness, or a second single shim plate of a second thickness, as illustrated in FIGS. 5 and 6. Finally, both shim plates 417, 419 may be added within the housing 402, as illustrated in FIGS. 7 and 8.

It should further be noted that various changes and modifications to the presently preferred embodiments described herein will be apparent to those skilled in the art. Such changes and modifications may be made without departing from the spirit and scope of the present invention and without diminishing its attendant advantages.

We claim:

1. An apparatus for managing the flow of fluid through a pipe comprising:
   a housing forming an internal chamber having an inlet opening and an outlet opening wherein pressurized fluid flows through the housing;
   a valve head mounted to a shaft and disposed within the internal chamber, the valve head configured to contact a seat in proximity to the inlet opening to form a closed position wherein the valve head contacting the seat prevents the flow of fluid through the housing and into the chamber from the inlet opening, wherein the valve head has a longitudinally non-linear surface that contacts the valve seat when the valve head is in the closed position;
   a base plate spanning a cross-section of the housing in proximity to the outlet opening, the base plate having a central opening slidably receiving the shaft, an internal surface, and at least one aperture within the base plate for allowing the flow of fluid through the outlet opening;
   a retainer within the housing disposed proximal to the base plate and the outlet opening, the retainer configured to hold the base plate in position within the housing;
   a first shim plate adjacent the base plate configured to shorten an effective length of a spring; wherein the first shim plate is disposed between the retainer and the base plate; and
   the spring around the shaft disposed between the base plate and the valve head, wherein movement of the valve head toward the base plate causes a compression of the spring.

2. The apparatus of claim 1 wherein the valve head is a shape selected from the group consisting of a partial sphere, a spheroid shape and an ovoid shape.

3. The apparatus of claim 1 wherein the valve seat comprises a mating surface configured to engage the surface of the valve head.

4. The apparatus of claim 3 wherein the mating surface of the valve seat comprises a corresponding shape as the valve head surface.

5. The apparatus of claim 1 further comprising:
   a second shim plate configured to shorten the effective length of the spring.

6. The apparatus of claim 5 wherein the second shim plate is in a position selected from the group consisting of adjacent the first shim plate and adjacent the base plate.

7. An apparatus for managing the flow of fluid through a pipe comprising:
   a housing forming an internal chamber having an inlet opening and an outlet opening wherein pressurized fluid flows through the housing;
   a valve head mounted to a shaft and disposed within the internal chamber, the valve head configured to contact a seat in proximity to the inlet opening to form a closed position wherein the valve head contacting the seat prevents the flow of fluid through the housing and into the chamber from the inlet opening;
   a base plate spanning a cross-section of the housing in proximity to the outlet opening, the base plate having a central opening slidably receiving the shaft, an internal surface, and at least one aperture within the base plate for allowing the flow of fluid through the outlet opening;
   a retainer within the housing disposed proximal to the base plate and the outlet opening, the retainer configured to hold the base plate in position within the housing;
   a spring around the shaft disposed between the base plate and the valve head, wherein movement of the valve head toward the base plate causes a compression of the spring; and
   a first shim plate configured to shorten an effective length of the spring compared to an apparatus without the first shim plate; wherein the first shim plate is disposed between the retainer and the base plate.

8. The apparatus of claim 7 wherein the first shim plate is positioned adjacent the base plate.

9. The apparatus of claim 7 further comprising:
   a second shim plate configured to shorten the effective length of the spring compared to the apparatus without the second shim plate.

10. The apparatus of claim 9 wherein the second shim plate is in a position selected from the group consisting of adjacent the first shim plate and adjacent the base plate.

11. The apparatus of claim 7 wherein the valve head has a longitudinally non-linear surface that contacts the valve seat when the valve head is in the closed position.

12. The apparatus of claim 11 wherein the valve head is a shape selected from the group consisting of a partial sphere, a spheroid shape and an ovoid shape.

13. The apparatus of claim 11 wherein the valve seat comprises a mating surface configured to engage the surface of the valve head.

14. The apparatus of claim 13 wherein the mating surface of the valve seat comprises a corresponding shape as the valve head surface.

15. A method of controlling the flow of fluid through a pipe comprising the steps of:
   providing a valve apparatus comprising a housing forming an internal chamber having an inlet opening and an outlet opening wherein pressurized fluid flows through the housing, a valve head mounted to a shaft and disposed within the internal chamber, the valve head configured to contact a seat in proximity to the inlet opening to form a closed position wherein the valve head contacting the seat prevents the flow of fluid through the housing and into the chamber from the inlet opening, a base plate spanning a cross-section of the housing in proximity to the outlet opening, the base plate having a central opening slidably receiving the shaft, an internal surface, and at least one aperture within the base plate for allowing the flow of fluid through the outlet opening, a retainer within the housing disposed proximal to the base plate and the outlet opening, the retainer configured to hold the base plate in position within the housing, and a spring around the shaft disposed between the base plate and the valve head, wherein movement of the valve head toward the base plate causes a compression of the spring; and adding a first shim plate in a position in the housing to shorten an effective length of the spring; wherein the first shim plate is disposed between the retainer and the base plate.

16. The method of claim 15 wherein the first shim plate is added to the housing at a position adjacent the base plate.

17. The method of claim 15 further comprising the step of:

adding a second shim plate to the housing to further shorten the effective length of the spring.

18. The method of claim 17 wherein the second shim plate is added to the housing at a position selected from the group consisting of adjacent the first shim plate and adjacent the base plate.

19. The method of claim 17 wherein the valve head has a longitudinally non-linear surface that contacts the valve seat when the valve head is in the closed position.

* * * * *